G. R. DEAN.
POWER TRANSMITTING DEVICE.
APPLICATION FILED JULY 17, 1905.
1,050,351.
Patented Jan. 14, 1913.
4 SHEETS—SHEET 1.
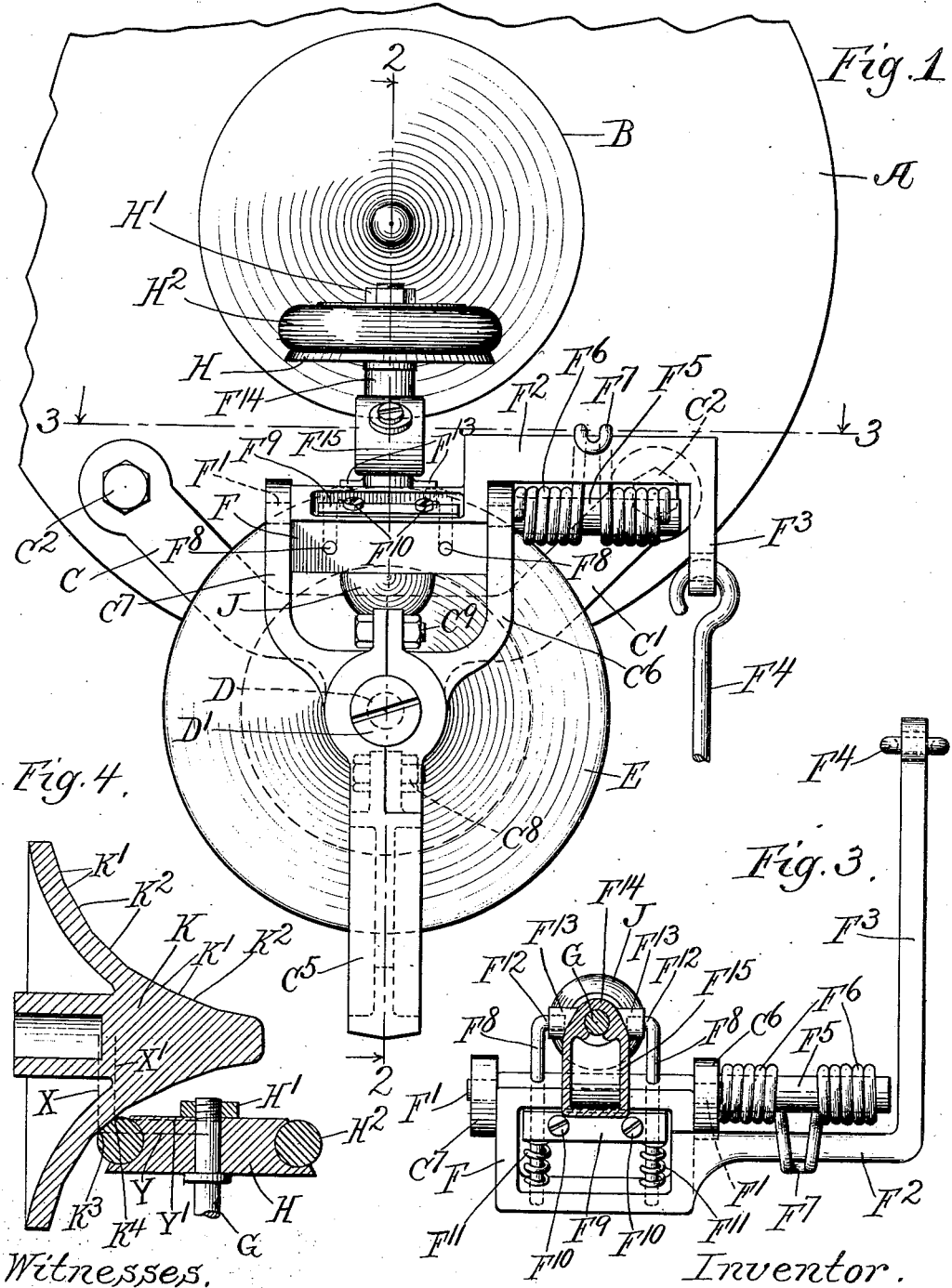
Witnesses.
Edward T. Wray
Homer J. Kraft
Inventor.
George R. Dean.
by Parker & Carter
Attorneys.

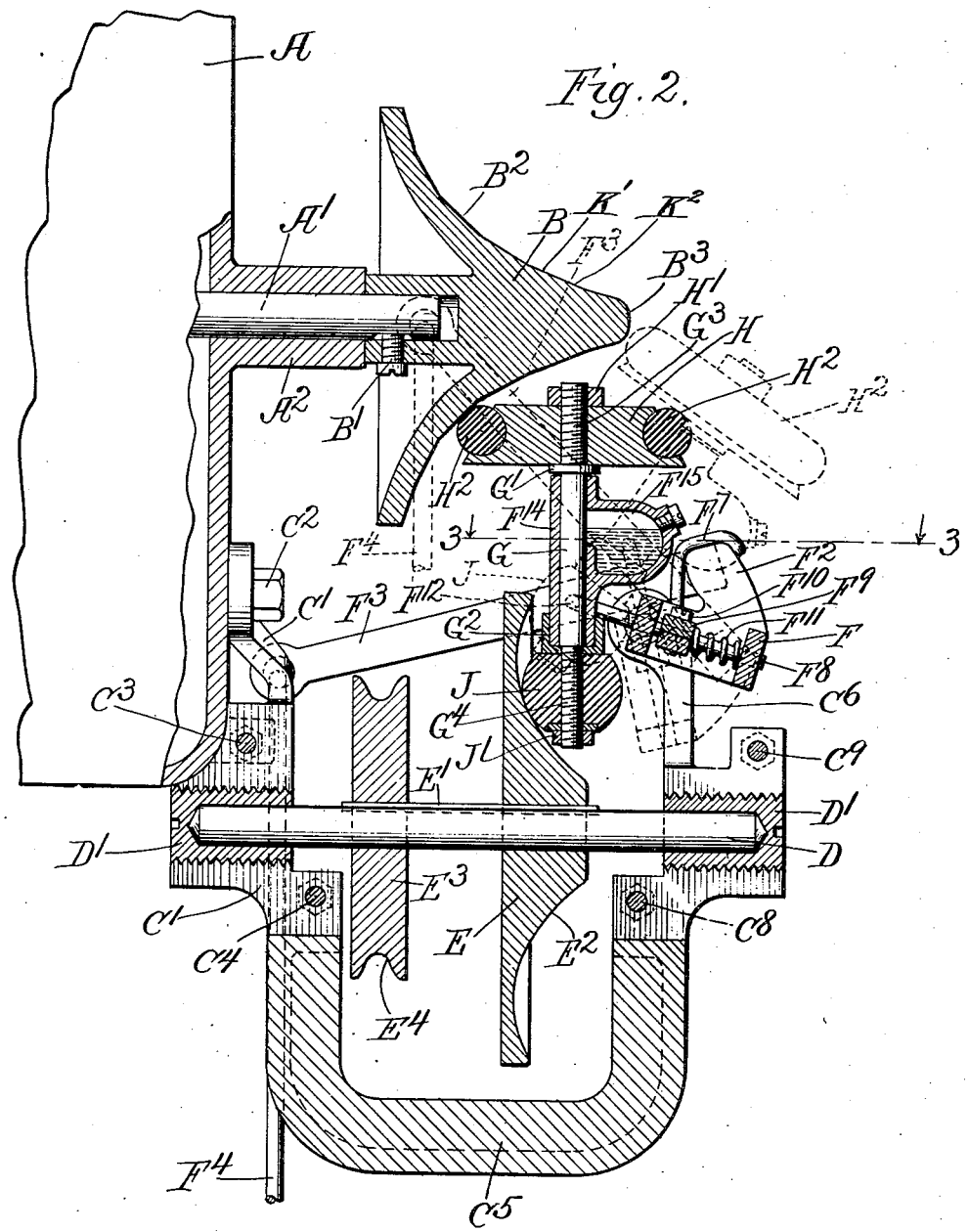

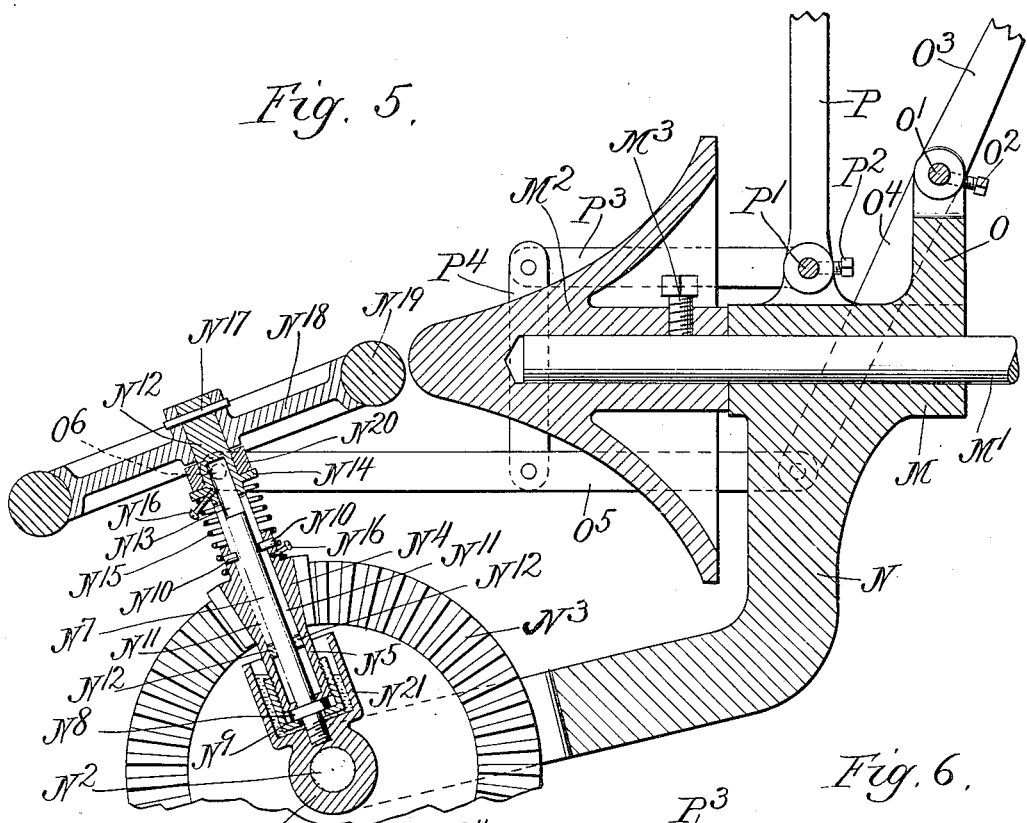
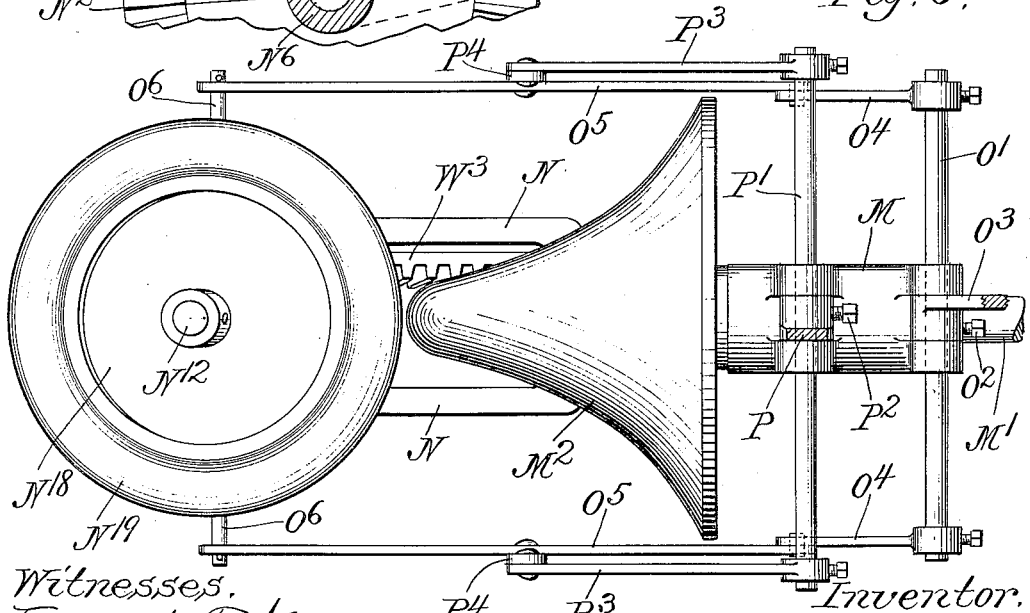

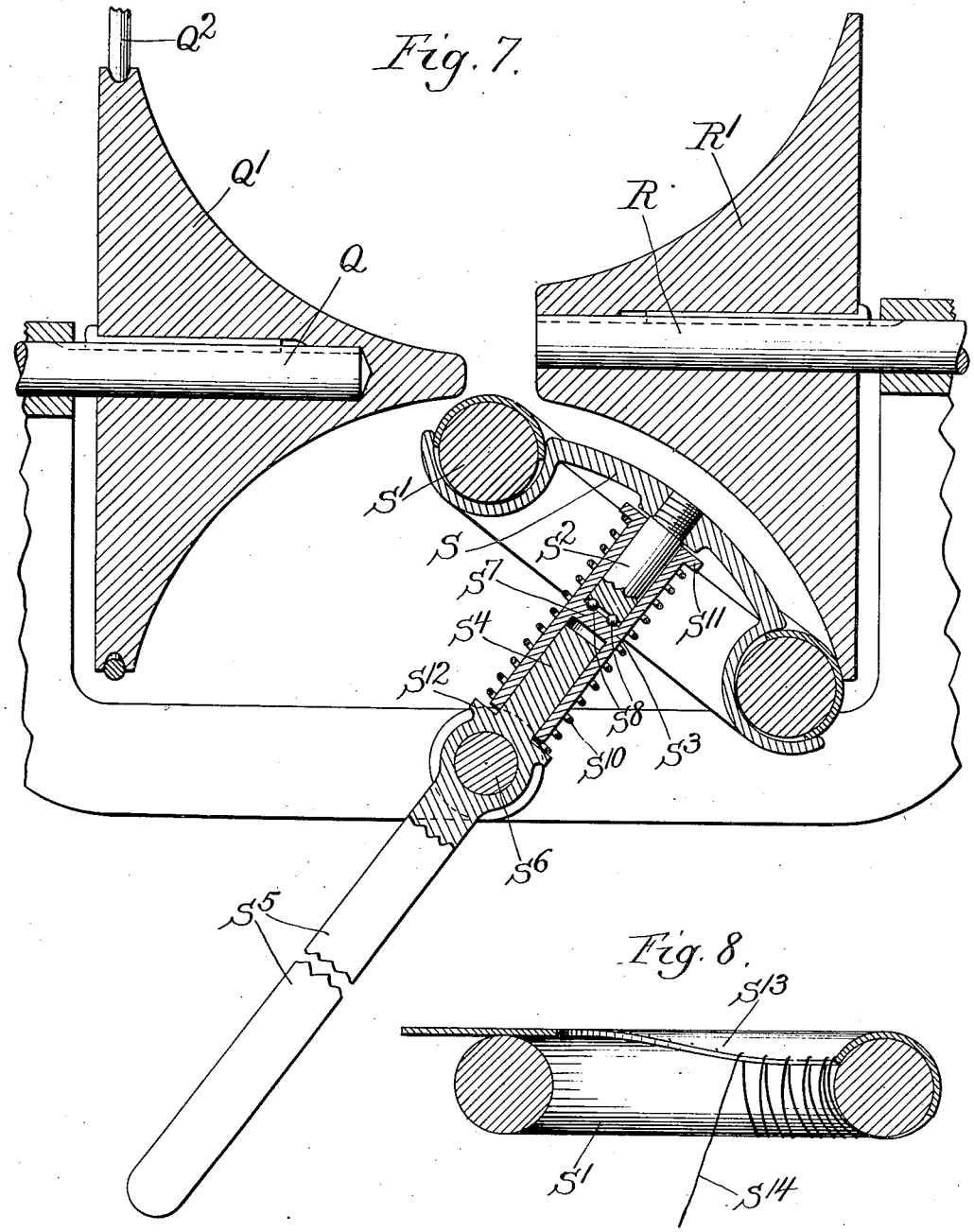

UNITED STATES PATENT OFFICE.

GEORGE R. DEAN, OF CHICAGO, ILLINOIS.

POWER-TRANSMITTING DEVICE.

1,050,351.　　　　Specification of Letters Patent.　　Patented Jan. 14, 1913.

Application filed July 17, 1905. Serial No. 269,911.

*To all whom it may concern:*

Be it known that I, GEORGE R. DEAN, a citizen of the United States, residing at Chicago, in the county of Cook and State of Illinois, have invented a certain new and useful Improvement in Power-Transmitting Devices, of which the following is a specification.

My invention relates to power transmitting devices and has for its object to provide new and improved constructions in devices of that class.

The invention is illustrated in the accompanying drawings wherein—

Figure 1 is a front view of one form of transmitting device; Fig. 2, a sectional view on line 2—2 of Fig. 1; Fig. 3, a sectional view on lines 3—3 of Figs. 1 and 2; Fig. 4, a detail showing a modified form of driving pulley; Fig. 5, a vertical sectional view through another modified form of apparatus; Fig. 6, a plan view of the same; Fig. 7, a vertical sectional view through another modification of transmitting apparatus, and Fig. 8, a detail showing one form of tire used on the transmitting pulley.

Like letters of reference indicate like parts in all the drawings.

Referring particularly to Figs. 1 to 3 inclusive, A represents a motor of any desired type having the shaft $A^1$ turning in bearings $A^2$, on which is the driving pulley B secured thereto by the set screw $B^1$. The driving pulley B, in this form of device, is preferably formed with a concaved conical surface $B^2$ preferably rounded off at the apex of the cone, as shown at $B^3$.

The driven shaft and the transmitting apparatus are supported in any desired manner, as for example, a frame work is formed of the webs C, $C^1$ bolted to the body of the motor at $C^2$ $C^2$ and bolted together at $C^3$, $C^4$, the web C being recessed to receive the end of the web $C^1$. The web $C^1$ is formed with the forwardly extending U shaped arm $C^5$ which is recessed to receive the end of the standard $C^6$ which corresponds with a similar standard $C^7$ at the other side of the arm $C^5$, the parts $C^6$ and $C^7$ forming a yoke at the front of the apparatus. The standard $C^6$ is secured to the arm by a bolt, as shown at $C^8$, and is bolted to the standard $C^7$ at $C^9$.

D is the driven shaft turning in screw threaded bushings $D^1$ $D^1$ in the webs C, $C^1$ at the rear, and the webs and the standards $C^6$, $C^7$ at the front of the device. The shaft D carries the driven pulley E, secured thereto by the feather $E^1$, this pulley being preferably in the form of a disk with its driving face concave, as shown at $E^2$. $E^3$ is another pulley feathered to the shaft D which is shown as grooved at $E^4$ for a belt.

The transmitting mechanism is carried on a tilted block F which is shown in detail in Fig. 3. This block is in the form of a hollow rectangle and is pivoted in the standards $C^6$, $C^7$ on trunnions $F^1$ $F^1$. From one side of the block F and preferably formed integral therewith is an elbow crank formed by the projecting arm $F^2$ preferably formed integral with the block F from which extends the crank arm $F^3$. To the end of the arm $F^3$ is hooked a rod $F^4$ connected to a pedal, not shown herein. Integral with the arm $C^6$ is the shaft $F^5$ to which is secured the spiral spring $F^6$, the middle portion of which is bent over to form a hook $F^7$ engaging with the projecting arm $F^2$. The block F is apertured to receive the rods $F^8$ $F^8$ and to these rods, within the hollow portion of the block, is clamped the block $F^9$ preferably formed in two sections secured together by the screws $F^{10}$ $F^{10}$. The spiral springs $F^{11}$ $F^{11}$ tend to force the block $F^9$ and the rods $F^8$ $F^8$ inwardly. The rods $F^8$ $F^8$ are turned inwardly to form pivots $F^{12}$ $F^{12}$ which extend into bosses $F^{13}$ $F^{13}$ on the sleeve $F^{14}$, in which turns the shaft of the transmission pulleys. The sleeve $F^{14}$ is preferably provided with the oil cup $F^{15}$. The shaft G turns within the sleeve $F^{14}$, being held in position by the flange $G^1$ and the cap piece $G^2$. The upper end of the shaft G is screw threaded as shown at $G^3$, to receive the upper transmission pulley H, held in position by the nut $H^1$ and preferably beveled and grooved on its perimeter to receive the tire $H^2$, of rubber or any preferred material. The lower end of the shaft G is also screw threaded, as shown at $G^4$, to receive the lower transmission pulley J, which is here shown as bulbous in form and is secured to the shaft G by the nut $J^1$. It will be seen that when the rod $F^4$ is drawn downward, for example, by depression of the pedal, the arm $F^3$ will be rocked and the block F tilted inwardly and downwardly so that the transmission pulley H is brought into contact with the driving pulley B. The position of the pulley H on the pulley B will depend, of course, on the degree of rotation of the block. The dotted lines in Fig. 2 show the position of the parts before the pedal has been depressed, the pulley H being then out of engagement with the driving pulley B. The full lines indicate the position of the parts with the pulley H half way up the pulley B. The pulley J, which may rest upon the edge of the driven disk E when the pulley H is idle, as shown by dotted lines in Fig. 2, with the tilting of the block is pushed inwardly along the surface $E^2$ of the disk E. The speed which the transmitting device receives from the pulley B will be increased as the pulley H is moved inwardly along the surface of the driving pulley, and likewise the speed transmitted to the driven disk E will be simultaneously accelerated as the pulley J travels toward the center of rotation of such disk.

The pulley J may be made of some more or less resilient material, as also the tire $H^2$ of the pulley H. If these parts are sufficiently soft, it will be evident that with the pressure exerted by the springs $F^{11}$ $F^{11}$ there will be a zone of contact between $H^2$ and the surface $B^2$ and J and the surface $E^2$ of some breadth. In order that the transmission of power should be perfect throughout such zone of contact, the curvature of the surfaces $B^2$, $E^2$ may be plotted according to a definite mathematical rule. This rule will be alluded to and explained in connection with a modified construction to be described later. It is not necessary in all cases that the curvature of the surfaces $B^2$, $E^2$ should be as described, nor is this an essential feature of my invention as here shown. If the area of contact between the parts is small, this feature is negligible. By this form of device I can get a very fine graduation and diminution of speed. When the pulley H is brought down to the rounded end $B^3$ of the driving pulley, the speed transmitted to the shaft D can be reduced so as to be scarcely perceptible. The operation of the parts in reduction of speed acts as a brake, particularly if performed slowly, so that when the transmission pulley leaves the driving disk the driven disk comes to a stand still almost immediately.

In Fig. 4 I have shown diagrammatically a modified form of driving pulley adapted to be used in the same form of apparatus shown in the three preceding figures. In this case the pulley which I have indicated by the letter K, has a bearing surface formed of a plurality of flattened zones $K^1$ $K^1$. These zones may be considered as developed by a series of straight lines of equal length, which may also be indicated by the letters $K^1$ $K^1$, the central points $K^2$ $K^2$ of which pass through the points equi-distant on the curve which is characteristic of the surface $B^2$ of Fig. 2. The curve determining the surface $B^2$ is substantially the correct curve to secure the perfect transmission of power referred to above. I have chosen, however, to illustrate this feature on the modification shown in Fig. 4. Where the pulley is formed with the flat surfaces, the rule will be true absolutely only on the central lines of such surfaces generated by the points $K^2$, the only points on the lines $K^1$ $K^1$ common to the lines $K^1$ $K^1$ and the correct curve. For other points on the flat surfaces the rule will hold only approximately. The curve is plotted in accordance with the simple rule that the speeds of two points on any rotating body are proportioned to the distance of such points from the axis of rotation. If the pulley H be pressed into contact with the pulley K so that the former is flattened to an extent indicated by the distance between the points $K^3$ and $K^4$, the speed with which these points travel on the pulley K will obviously be different and will be proportioned to their perpendicular distances to the axis of rotation of the pulley. These distances are indicated respectively by the letters X, $X^1$. The points $K^3$, $K^4$ on the pulley H will also necessarily travel at speeds proportioned to their perpendicular distances from the axis of rotation of that pulley, these distances being indicated respectively by the letters Y, $Y^1$. In order, therefore, that there should be no slip between the driven and the driving pulley at any places in their common area of contact, it is necessary that the points $K^3$, $K^4$, should be so located that the ratio $X:Y::X^1:Y^1$ will hold good. By taking into consideration the diameter of the pulley H, the curve of the driving pulley may be plotted so that this ratio will always exist. Even when the surface is flattened, as shown in Fig. 4, the operation of the transmitting mechanism will be approximately correct. The concaved surface $E^2$, Fig. 2, may be formed on a curve plotted in a similar manner.

In Figs. 5 and 6 I have shown another form of transmitting device somewhat similar to the forms above described, but which substitutes toothed gearing for the friction gear in transmitting power to the driven shaft. This form of apparatus is also capable of being reversed. In the drawings, M represents a framework in which is journaled the power shaft $M^1$ on the end of which is the cone pulley $M^2$ secured by the set screw $M^3$. An arm N extends from the frame work and is forked to form a bearing for the driven shaft $N^2$ carrying the bevel pinion $N^3$ into which meshes the pinion $N^4$ having a hub $N^5$. In a sleeve $N^6$ on the shaft $N^2$ is screwed the shaft $N^7$, having the flange $N^8$ against which abuts the end of the hub $N^5$ of the pinion $N^4$. A cap $N^9$ screwed on the hub $N^5$ extends beneath the flange $N^8$ and holds the pinion $N^4$ from vertical motion. The pinion $N^4$ has the two inwardly extending pins $N^{10}$ $N^{10}$ which are received in longitudinal slots $N^{11}$ $N^{11}$ in the shaft $N^{12}$ which has the central bore $N^{13}$ so as to extend over the shaft $N^7$. The shaft $N^{12}$ is provided with the flange $N^{14}$ and between this flange and the pinion $N^4$ is a spiral spring $N^{15}$ secured to the shaft $N^{12}$ and the pinion $N^4$ by the screws $N^{16}$ $N^{16}$. This spring is not under tension when the parts are in the position shown in Fig. 5. Secured to the end of the shaft $N^{12}$ by the pin $N^{17}$ is the transmission pulley $N^{18}$ having preferably the tire $N^{19}$. Between the pulley $N^{18}$ and the flange $N^{14}$ is interposed a collar $N^{20}$ which is loose on the shaft $N^{12}$. An oil cup $N^{21}$ may be formed on the sleeve $N^6$. It will be seen, therefore, that if the pulley $N^{18}$ is rotated, the shaft $N^{12}$ will be turned and with it the pinion $N^4$ because of the engagement with the pins $N^{10}$ $N^{10}$ in the slots in the shaft. The position of the pinion $N^4$ is invariable, but the shaft $N^{12}$ may be moved longitudinally, and the whole transmitting apparatus may be swung on the shaft $N^2$ as a pivot. To accomplish this result, the frame M is made with the lug O to form a bearing for the rock shaft $O^1$, to which is secured by the set screw $O^2$, the hand lever $O^3$. Centrally thereof and at its ends are the levers $O^4$ $O^4$ to which are pivoted the links $O^5$ $O^5$ carrying the pins $O^6$ $O^6$ which take into perforations in the sleeve $N^{20}$. By pushing the lever to the left, as the parts are shown in Fig. 5, the transmission pulley $N^{18}$ is brought into contact with the end of the driving pulley $N^3$ and a further movement of the lever $O^3$ will carry the pulley $N^{18}$ along the under surface of the driving pulley, the spring $N^{15}$ being compressed to accommodate for the motion of the pulley in the direction longitudinal of its shaft. The pulley $N^{18}$ will travel on the under side of the driving pulley because the parts are arranged so that the transmission pulley stands normally below the center of the driving pulley. In order to reverse, it is necessary to carry the transmission pulley into contact with the upper side of the driving pulley. This is accomplished by means of the hand lever P secured to a rock arm $P^1$, for example, by the set screw $P^2$, the rock arm carrying rigidly secured thereto the side levers $P^3$ $P^3$ pivotally connected with the links $O^5$ $O^5$ by vertical links $P^4$ $P^4$. When the lever P is drawn to the right, as shown in Fig. 5, the left hand ends of the links $O^5$ $O^5$ are drawn upward and the pulley $N^{18}$ carried around the end of the pulley $N^2$ and onto its upper surface. As soon as the two pulleys are brought into contact, the transmission pulley will be wormed upward along the surface of the driving pulley by the rotary action of the same, the extent of travel being governed by the levers. If desired, the transmission pulley may be forced along the upper side of the driving pulley when it has once reached the upper surface, by means of the lever $O^3$. When the pulley is in this position the contact will be maintained by the spring $N^{15}$ which is now stretched instead of being compressed. Ordinarily the operator will manipulate the apparatus by having a hand on each lever.

In Fig. 7 I have illustrated a still further modification in which the driving and the driven shafts are both journaled in fixed bearings and carry pulleys between which the transmission pulley is interposed. In this drawing, Q represents the driving shaft on which is feathered the cone pulley $Q^1$ having grooves to receive the belt $Q^2$ by means of which it is driven. R is the driven shaft carrying the pulley $R^1$ also conical, but truncated so as to leave some space between the ends of the pulleys. The transmission pulley S, carrying the tire $S^1$, has the spindle $S^2$ which extends into the end of the sleeve $S^3$, the other end of which surrounds the stem $S^4$ at the end of the lever $S^5$ pivoted to a stationary part of the apparatus at $S^6$. Within the sleeve $S^3$ is the transverse partition $S^7$ to form a bearing upon which rests the spindle $S^2$. Ball bearings $S^8$ may be interposed between the parts. A spring $S^{10}$ presses at one end against a flange $S^{11}$ on the sleeve $S^3$ and at the other on a flange $S^{12}$ on the lever $S^5$. This spring keeps intimate the contact between the transmission pulley S and the driving and driven pulleys. The tire $S^1$ may be protected by a shoe $S^{13}$ secured thereto by the lacing $S^{14}$. This shoe may be of leather or any preferred material. It will be observed that the bearing surfaces of the pulleys $R^1$ and $Q^1$ present a curve at the lower sides of these pulleys which is the arc of a circle struck from the pivotal point of the lever supporting the transmission pulley. The pulley, therefore, need not have any movement in the direction longitudinal of its axis except such slight play as is necessary to secure the intimate contact of the tire of the pulley with the driven and the driving pulleys.

I have thus described several forms of apparatus embodying my invention in several of its applications, but it will be evident that there might be very great change made in the forms, constructions and devices used, and also in dimensions, proportions and materials without departing from the spirit of my invention. I, therefore, do not wish to limit myself to the particular devices and constructions herein shown, but desire that they be taken as illustrations of a few practical embodiments out of the many which might be devised according to the exigencies of the occasion.

I claim:

1. A power transmitting apparatus comprising a generally concaved conical driving pulley, a driven pulley mounted upon an axis parallel with the driving pulley, said driven pulley having a concaved annular ring upon one side thereof and a yielding transmitting mechanism between such pulleys.

2. A power transmitting apparatus comprising a generally concaved conical driving pulley, a driven pulley, said driven pulley having a concaved annular ring upon one side thereof and a yielding transmitting mechanism between such pulleys.

3. The combination with a driving and a driven friction pulley, said pulleys each having a generally concaved conical bearing surface, of transmitting mechanism between them, comprising a shaft and friction pulleys one of said pulleys adapted to be constantly in engagement with the driven pulley, the other adapted to move along the surface of the driving pulley and to be out of contact with it at the end of its excursion, said transmitting mechanism adapted to rotate about an axis.

4. The combination with a driving and a driven friction pulley, said pulleys each having a generally concaved conical bearing surface, of transmitting mechanism between them, comprising a shaft and friction pulleys one of said pulleys adapted to be constantly in engagement with the driven pulley and to be out of contact with it at the end of its excursion, said transmitting mechanism adapted to rotate about an axis intermediate its two ends and means independent of the driving pulley for rotating such transmitting mechanism.

5. A power transmitting device comprising driving and driven friction pulleys of graduated diameter and a movable transmitting mechanism normally out of engagement with one of said pulleys and means for forcing said mechanism yieldingly against the friction pulleys.

6. A power transmitting device comprising driving and driven friction pulleys of graduated diameter, a movable transmitting mechanism normally out of engagement with one of said pulleys, means for forcing said mechanism yieldingly against the friction pulleys and means for carrying it along the face of the pulleys.

7. A power transmitting apparatus comprising a plurality of rotating devices in contact one with the other, one of said devices having an extended bearing surface made up of a plurality of truncated cones located about a common axis but of varying angularity.

8. In a power transmitting apparatus the combination of two rotating devices in engagement so that motion is imparted from one to the other and having an appreciable common area of contact, one of such devices having an extended bearing surface made up of a plurality of truncated conical surfaces, the inclination of successive surfaces, one to another, being determined by the curve expressive of the ratio between the perpendicular distances from the opposite sides of the common area of contact to the axes of rotation of the two devices.

9. In a power transmitting apparatus the combination of two rotating devices in contact so that the motion of one is imparted to the other, one of said devices having a generally concaved conical bearing surface made up of a plurality of truncated conical cones.

10. A power transmitting mechanism comprising a driving and a driven friction pulley, friction engaging means intermediate them comprising a rotating shaft and pulleys thereon, means for rotating said shaft about an axis perpendicular to its axis of rotation and intermediate its two ends.

11. A power transmitting mechanism comprising a driving and driven friction pulley, friction engaging means intermediate them comprising a rotating shaft and pulleys thereon, means for rotating said shaft about an axis perpendicular to its axis of rotation and intermediate its two ends and means for bodily moving said axis.

GEORGE R. DEAN.

Witnesses:
HOMER L. KRAFT,
PERCIVAL A. TRUMAN.